(12) United States Patent
Bühler et al.

(10) Patent No.: US 8,507,598 B2
(45) Date of Patent: Aug. 13, 2013

(54) TRANSPARENT POLYAMIDE MOULDING COMPOUND

(75) Inventors: Friedrich Severin Bühler, Thusis (CH); Christian Rytka, Bonaduz (CH); Walter Alois Tobisch, Tamins (CH); Sepp Bass, Domat/Ems (CH)

(73) Assignee: EMS-Patent AG, Domat/EMS (CH)

( * ) Notice: Subject to any disclaimer, the term of this patent is extended or adjusted under 35 U.S.C. 154(b) by 0 days.

(21) Appl. No.: 12/339,573

(22) Filed: Dec. 19, 2008

(65) Prior Publication Data
US 2009/0163634 A1 Jun. 25, 2009

(30) Foreign Application Priority Data
Dec. 21, 2007 (DE) .................. 10 2007 062 063

(51) Int. Cl.
*C08K 5/101* (2006.01)
*C08G 69/36* (2006.01)
*C08G 69/26* (2006.01)

(52) U.S. Cl.
CPC .............. *C08K 5/101* (2013.01); *C08G 69/265* (2013.01); *C08G 69/36* (2013.01)
USPC ......................................... 524/318; 528/324

(58) Field of Classification Search
USPC ................................. 524/400, 318; 528/324
See application file for complete search history.

(56) References Cited

U.S. PATENT DOCUMENTS

| | | | | | |
|---|---|---|---|---|---|
| 4,232,145 | A | * | 11/1980 | Schmid et al. | 528/324 |
| 4,511,684 | A | * | 4/1985 | Schmid et al. | 524/101 |
| 4,826,955 | A | * | 5/1989 | Akkapeddi et al. | 528/324 |
| 4,970,255 | A | * | 11/1990 | Reimann et al. | 524/321 |
| 5,183,843 | A | * | 2/1993 | Sakai et al. | 524/318 |
| 5,391,640 | A | * | 2/1995 | Akkapeddi et al. | 525/432 |
| 5,412,017 | A | * | 5/1995 | Gareiss et al. | 524/436 |
| 5,684,120 | A | * | 11/1997 | Torre | 528/346 |
| 5,710,216 | A | * | 1/1998 | Weber et al. | 525/132 |
| 5,723,137 | A | * | 3/1998 | Wahle et al. | 424/401 |
| 6,022,613 | A | * | 2/2000 | Ren | 428/220 |
| 6,297,345 | B1 | | 10/2001 | Okushita et al. | 528/170 |
| 6,515,058 | B1 | * | 2/2003 | Tomiyama et al. | 524/322 |
| 6,831,137 | B2 | * | 12/2004 | Torre et al. | 525/432 |
| 2003/0055160 | A1 | * | 3/2003 | Yamazaki et al. | 524/606 |
| 2003/0235666 | A1 | * | 12/2003 | Buhler | 428/35.7 |
| 2006/0051549 | A1 | * | 3/2006 | Mano | 428/40.1 |
| 2006/0142443 | A1 | * | 6/2006 | Aramaki et al. | 524/115 |
| 2006/0183869 | A1 | * | 8/2006 | Dowe et al. | 525/340 |
| 2007/0128442 | A1 | | 6/2007 | Buehler et al. | |
| 2008/0015303 | A1 | * | 1/2008 | Eibeck et al. | 524/537 |
| 2008/0021143 | A1 | * | 1/2008 | Thullen et al. | 524/423 |
| 2010/0019210 | A1 | * | 1/2010 | Weber et al. | 252/511 |
| 2010/0022742 | A1 | * | 1/2010 | Buhler et al. | 528/323 |
| 2010/0323185 | A1 | * | 12/2010 | Hala et al. | 428/323 |

FOREIGN PATENT DOCUMENTS

| | | |
|---|---|---|
| DE | 2642244 A1 | 3/1977 |
| DE | 10 2007 062 063.4 R | 3/2008 |
| EP | 0 725 100 | 8/1996 |
| EP | 0725100 A1 | 8/1996 |
| EP | 0725100 W | 8/1996 |
| EP | 0885930 A1 | 12/1998 |
| EP | 0885930 W | 12/1998 |
| EP | 1 570 983 | 9/2005 |
| EP | 1570983 A1 | 9/2005 |
| EP | 1788025 A1 * | 5/2007 |
| GB | 1548431 | 7/1979 |
| WO | WO-2006 042705 | 4/2006 |
| WO | WO 2006042705 A1 * | 4/2006 |
| WO | 2007087896 A1 | 8/2007 |
| WO | WO-2007 087896 | 8/2007 |
| WO | WO 2007087896 A1 * | 8/2007 |

OTHER PUBLICATIONS

Machine translated English equivalent of EP 1 788 025 (4 pages.* EP 1.*
Plastics Technology (Lubricants and processing aids, Plastics Technology, Oct. 2002, 14 pages, specifically p. 4).*
Office Action for German Application No. 10 2007 062 063 dated Sep. 10, 2010.
Thomson Innovation Record View, English Translation of Claims and Description retrieved on Oct. 29, 2010; English Abstract of EP-0 725 100.

* cited by examiner

*Primary Examiner* — Ling Choi
*Assistant Examiner* — Brieann R Fink
(74) *Attorney, Agent, or Firm* — Millen, White, Zelano & Branigan, P.C.

(57) ABSTRACT

The invention relates to polyamide molding compounds with improved scratch resistance, which are constructed from
(A1) 50 to 99.99 parts by weight of a copolyamide,
(A2) 0 to 49.99 parts by weight of a transparent polyamide,
(A3) 0 to 29.99 parts by weight of an aliphatic polyamide,
(B) 0.01 to 5 parts by weight of at least one lubricant, and
(C) 0 to 3 parts by weight of further additives,
with the proviso that the sum of (A1) and (A2) and (A3) and (B) produces 100 parts by weight.

18 Claims, No Drawings

TRANSPARENT POLYAMIDE MOULDING COMPOUND

The invention relates to the formulation, production and finishing of transparent, amorphous or microcrystalline polyamides, copolyamides or polyamide blends with improved scratch resistance.

Scratch resistance is the resistance of a surface to single-occurrence mechanical external influences, e.g. the scratching motion of a sharp edge. A distinction is made between: gouging scratch exposure, stick-slip scratch exposure and cutting scratch exposure.

Abrasion resistance is the resistance to continuous undesired material loss of the useful surface of plastic materials which is caused by the cutting or scratching removal effect of a friction partner.

Transparent polyamides have excellent transparency and a low haze (opacity). Most additives change these optical properties very negatively. The usability of transparent products depends substantially upon the opacity (haze) which is increased by damage to the surface. A particular type of scratch resistance is for example the resistance of an uncoated plastic material surface relative to a PE pen. This property is required for example in display applications which are operated with a PE pen.

US 2007/0066726 A1 describes the improvement in scratch resistance in ABS, PBT, PVC, PET, Nylon 6, Nylon 66, ABS/PBT, PC/ABS with additives. Additives are olefin polymers or copolymers, which are functionalised with carboxylic acids, such as Polybond or Epolene and fatty acid amides. Suitable fatty acid amides are oleic acid, palmitin amide and stearyl erucamide. The finished polymers display excellent scratch resistance, weathering stability, good processing behaviour and good mechanical properties whilst maintaining a high gloss value. However no information relating to the behaviour of the optical properties in transparent polymers can be deduced from the publication.

EP 0 943 651 describes copolyester elastomers with Shore D=25-82 and 0.1-1.0% fluoroalkylethylenes for improving the scratch resistance. The scratch resistance was tested with an Erichson scratch tester according to ISO 1518. A reference to the behaviour of the transparency in transparent polyamides is equally unable to be deduced from the publication.

The increase in scratch resistance of PP with tallow is known from EP 0 682 679. The scratch resistance can be further improved by the use of polysiloxanes, as is described for example in U.S. Pat. No. 5,731,376. The scratch test was implemented with a tester by "Sheen Instruments Ltd." and evaluated visually. The measured parts are always made of PP and hence not transparent. However the patent specification does not allow a conclusion to be drawn about the influence of the materials which are used on the scratch resistance of polyamides.

WO 2007/087896 describes a PA formulation together with lubricants which however are only mentioned in a general manner, no further information is given in this respect.

Transparent polyamides and various lubricants are described in EP 1 570 983. The term "scratch resistance" is mentioned in connection with the adhesion test of a hard coat (hard lacquer coating) on a lens. The scratch resistance according to this patent specification always results from the hard lacquer coating.

DE 101 22 188 mentions high-refractive (optical refractive index) transparent copolyamides which inter alia also have high scratch resistance, the diamines being selected preferably from those with aromatic nuclei. Lubricants are only mentioned in general amongst the possible additives.

The polyamides produced according to JP 2003-118055 are classified in general as relatively scratch-resistant but normal aliphatic polyamides are always used.

In the case of JP 08-083515, the transparent and scratch-resistant surface layer comprises polyamide imide, i.e. not a polyamide, but a polymer which is only a "half" polyamide. In the latter, cycloaliphatic diamines are contained according to the teaching of this publication.

U.S. Pat. No. 4,740,450 does not describe PA moulding compounds but the improvement in scratch resistance of the surface of reproduced images or photographs. Polyamide is mentioned, in addition to other polymers, merely as a possible binder or hot-melt adhesive material. According to this US patent, the photosensitive resin layer or a layer deposited thereon is finished with a scratch resistance improver, many suitable compounds being listed.

Starting from this technological background, it was the object of the present invention to indicate a transparent polyamide composition which has increased scratch resistance. In particular, the excellent optical properties of transparent polyamides are thereby intended not to be influenced negatively. It is likewise the object of the present invention to indicate moulded articles formed from the corresponding polyamide composition and corresponding possibilities for use.

This object is achieved with respect to the polyamide moulding compound with the features of patent claim 1. With patent claim 14, moulded articles produced from the PA composition are indicated. The respective dependent claims relate to advantageous embodiments.

According to the invention, a transparent polyamide moulding compound, containing at least one copolyamide and one lubricant is provided, the polyamide moulding compound containing (A1) 50 to 99.99 parts by weight of a copolyamide, constructed from:
  a) 15 to 45% by mol bis-(4-amino-3-methyl-cyclohexyl) methane (MACM), which can be replaced up to 50% by mol by bis-(4-amino-cyclohexyl)methane (PACM) and/or hexamethylenediamine (HMDA),
  b) 15 to 45% by mol isophthalic acid (IPS), which can be replaced up to 50% by mol by terephthalic acid (TPS) and/or aliphatic dicarboxylic acids, and
  c) 10 to 70% by mol laurinlactam (LC 12), and
(A2) 0 to 49.99 parts by weight of a transparent polyamide based on MACM and/or PACM and dicarboxylic acids with at least 9 C-atoms, and
(A3) 0 to 29.99 parts by weight of an aliphatic polyamide based on monomers selected from diamines with at least 8 C-atoms, dicarboxylic acids with at least 10-C atoms, lactams with at least 10 C-atoms and amino carboxylic acids with at least 10 C-atoms, the sum of (A2) and (A3) being at most 49.99 parts by weight, and
(B) 0.01 to 5 parts by weight of at least one lubricant selected from salts of stearic acid, isotridecylstearate and/or salts of montanic acids, and
(C) 0 to 3 parts by weight of further additives, with the proviso that the sum of (A1) and (A2) and (A3) and (B) produces 100 parts by weight.

Surprisingly, it was now found that polyamides can be influenced in scratch resistance by the choice of monomers according to the invention. Compositions were found which have comparable scratch resistances, such as for example moulded articles made of polycarbonate which are coated with hard coat.

These polyamides according to the invention are thereby in the range of average rigidity with excellent toughness. At the same time, excellent transparency close to that of PMMA with haze values below 1.0% is obtained.

Furthermore, it was found that the scratch resistance can be increased even further by the selection and also the content according to the invention of lubricants and the excellent transparency is thereby maintained at the same time. The problem that lubricants increase the haze and reduce the transmission is known from the state of the art.

Surprisingly, lubricants have been found which do not negatively influence the transparency, do not increase the haze and improve the scratch resistance of the transparent polyamides. These lubricants can be added directly to the polymer by mixing with the polymer or preferably as a highly concentrated master batch.

Outstandingly suitable for the use according to the invention are salts of stearic acid, isotridecylstearate and/or salts of montanic acids, montanic acid esters and the Ca salts thereof (Licomont and Licomont CAV types) since they display low opacity.

As a result, the scratch resistance relative to exposure on an everyday basis or relative to PE pens is improved. Improved scratch resistance prevents loss of gloss or dulling of the surface. As a result, optical functions, cosmetic appearance or the sliding properties in use are maintained for longer, as a result of which the reliability and lifespan of such components is substantially increased.

In particular the resistance of the surface of the polyamide composition according to the invention relative to scratching by the effect of hard or soft materials is significantly improved. Such materials can be objects in a handbag, cleaning wipes or washing brushes.

It is preferred if the at least one lubricant (B) is contained with a proportion of 0.1 to 3% by weight, further preferred 0.2 to 2% by weight, particularly preferred 0.5 to 1.5% by weight and very particularly preferred 0.8 to 1.2% by weight.

A particularly preferred lubricant is a Ca salt of montanic acids and/or isotridecylstearate, stearylstearate and/or a metal stearate, isotridecylstearate (trade name Loxiol G 40) being particularly preferred.

A preferred choice of monomers provides that the copolyamide (A1) is constructed from the educts
 a) 30 to 42% by mol MACM, which can be replaced up to 50% by mol by PACM,
 b) 30 to 42% by mol IPS, which can be replaced up to 50% by mol by TPS and/or aliphatic dicarboxylic acids, and
 c) 16 to 40% by mol LC12.
The following choice of educts is hereby possible in particular:
 a) 35 to 40% by mol MACM
 b) 18 to 22% by mol IPS and also
   16 to 20% by mol TPS and
 c) 22 to 27% by mol LC 12.

The further additives (C) are thereby selected preferably from the group of UV stabilisers, heat stabilisers, catalysts, transparent colourants, phototropic additives, antistatic agents, processing aids and laser marking additives.

The relative viscosity (RV) of the polyamide moulding compound, measured in 0.5% m-cresol solution, is thereby preferably >1.45, particularly preferred 1.53 to 1.56.

The polyamide moulding compound is characterised by a preferred Tg value of >175° C.

When testing the polyamide moulding compound in the form of a sheet with a thickness of 2 mm, the opacity (haze), measured according to the Byk Gardner test according to ASTM 1003, is greater by preferably at most 200% than that of a 2 mm thick sheet made of an otherwise identical polyamide moulding compound, however without lubricant (B).

It is likewise advantageous if the polyamide mouldling compound, when tested in the form of a sheet with a thickness of 2 mm, has an opacity (haze), measured according to the Byk Gardner test according to ASTM 1003, after a treatment duration of 2 hours in the tumbler, which is less than that of a 2 mm thick plate made of an otherwise identical polyamide moulding compound, however without lubricant (B), which was subjected also to the same treatment in the tumbler.

The moulding compounds have excellent transparency. It is hereby advantageous if the transmission, when tested in the form of a sheet with a thickness of 2 mm, is >90%, preferably >91%.

A further advantageous embodiment provides that a test body produced from the polyamide moulding compound has a modulus of elasticity of at least 1800 MPa.

According to the invention, moulded articles, produced from the transparent polyamide moulding compound according to the invention, are likewise provided. The moulded articles can thereby be configured with or without additional surface coating, such as e.g. a hard coat lacquering.

There are possible in principle as processing or production methods for the moulded articles made of the moulding compounds according to the invention, all thermoplastic shaping methods, e.g. injection moulding, injection-compression moulding, injection blow moulding, injection stretch blow moulding, extrusion, pipe extrusion, profile extrusion, sheet extrusion, extrusion-blow moulding. Of course, the moulded articles can also be further processed subsequently.

It is thereby particularly advantageous that the moulded articles according to the invention, in particular those for highly transparent and scratch-resistant applications, preferably have no additional surface coating (i.e. manage without protective lacquer or hard coating on the surface).

The possibility is however likewise provided of providing the moulded articles with a surface coating (e.g. as protective coating). In this case, i.e. when coating the moulded articles according to the invention with a hard coat, double security is produced, i.e. the moulded article can fulfil its function without opacity even further and for a longer time, even if the lacquer layer would be worn or rubbed after some time. Such requirements for double protection are already available in practice for complex technical devices or systems in which exchanging a transparent functional part would not be possible or too complex, such as e.g. displays or camera lenses. For such special purposes of use, additional security could be obtained with the lacquering of the moulded articles which are already per se scratch-resistant and the lifespan of an entire system could be prolonged. Measured by the price of a complex total system, the costs here for subsequent lacquering of a small transparent moulded article would not be of great consequence.

Possibilities for use of the moulding compound or of the moulded articles produced therefrom are highly transparent and scratch-resistant applications, in particular for moulded articles, such as lenses, magnifying glasses, spectacles, optical filters, prisms, Fresnel lenses, infrared windows, windows, protective windows, protective foils, display windows, light coverings, claddings or housings, displays, touch screens, sensor housings, mobile phones, telephones, measuring devices, music systems, TV sets, navigation apparatus, cameras, wrist watches, game computers, play consoles, PCs, operating buttons, screens or touch panels, handles, containers, bottles, boxes, pipes or profiles.

The present invention is clarified in more detail with reference to the subsequent tests and examples. The examples should thereby in no way be understood to restrict the invention to the parameters used in particular in the examples.

EXAMPLE 1

Comparison of the Scratch Resistance Relative to Commercially Available Plastic Materials The particularly high scratch resistance of the polyamide compositions according to the invention was determined by the handbag test or the tumbler test. In the case of the handbag test, two lens plates, glued on the rear side, are added to the contents of the handbag and agitated in the granulate mixer for one hour, whilst, in the case of the tumbler test, a 10 kg barrel is filled with 5 kg PE granulate and the test piece, a lens plate with the dimensions 100×80×2 mm, is placed in the granulate. The barrel is then rotated asymmetrically over the desired time (in the present case 2 hours). The term tumbler thereby stands for a rolling barrel with an external motor drive in order to make it rotate in a skewed position in cooperation with gravitation, and the mixing effect resulting therefrom, in which normally granulates are rolled with pulverulent additives for small tests. In the present case, this barrel is however not for rolling but used solely in its function as tumbler, also a certain quantity of polyethylene granulate being filled into the barrel in addition to the 2 mm thick test plates. The PE granulate which in fact has certain round portions and slight edges, rubs and scratches during rotation of the tumbler on the surfaces of the test plates, similarly to a PE pen or comparably to objects in a handbag which is shaken.

The handbag test is a non-specific test for all possible types of scratches. The general scratch resistance which is composed of frequently occurring types of exposure is determined here.

The results of the handbag test are compiled in Table 1.

TABLE 1

Handbag test of TR 60 in comparison with commercially available plastic materials
(PC: polycarbonate, PMMA: polymethylmethacrylate, HC: Hard coat)

|  |  | Example | Comparative Examples | | | |
| --- | --- | --- | --- | --- | --- | --- |
| Polyamide |  | E1 | CE1 | CE2 | CE3 | CE4 |
| Type |  | TR60 | PC Lexan LS2 | PMMA 8N | PC + HC Lexan LS2 | PMMA + HC 8N |
| MACM | % by mol | 37.7 | | | | |
| IPS | % by mol | 19.3 | | | | |
| TPS | % by mol | 18.4 | | | | |
| LC12 | % by mol | 24.6 | | | | |
| Sum | % by mol | 100 | | | | |
| Properties | | | | | | |
| Tg | ° C. | 192 | | | | |
| MVR/275° C./5 ccm/10 min | kg | 4 | | | | |
| E-modulus | MPa | 2200 | | | | |
| KSZ/RT | kJ/m$^2$ | 8 | | | | |
| Haze/2 mm | % original | 0.4 | 0.4 | 0.1 | 0.3 | 0.1 |
| Transp./2 mm | % original | 93.4 | 91.8 | 94 | | |
| Scratchtest | Handbag | | | | | |
| Haze/2 mm | difference % | 0.73 | 3.2 | 3.18 | 1.14 | 1.63 |

Grilamid TR 60 with $T_g=190°$ C. shows the lowest increase in haze according to the handbag test. Compared thereto, polycarbonate and PMMA show significantly higher haze values. After the coating of PC and PMMA with commercially available hard coats which are used in the spectacle industry, both polymers display significantly better haze values according to the handbag test. However they are still poorer than for Grilamid TR 60 without hard coat. The handbag test corresponds to a frequently occurring exposure of transparent surfaces. Relative to this type of exposure, Grilamid TR 60 displays the highest tolerance and is also better than coated PC or PMMA. The hard coat only presents advantages initially and later significant disadvantages. PA TR 60 in the handbag test has a very balanced property profile relative to different types of effect. The addition of lubricants increases the resistance to blunt impacts, such as PE granulate. The improved general scratch resistance even without protective coating emerges significantly from the handbag test.

EXAMPLE 2

Comparison of the Added Additives in the Tumbler Test

The scratch resistance depends very greatly upon the manner in which scratches are produced. Needle-like hard metal tips thus produce a different type of damage from soft PE pen tips on display surfaces. Pencils or for example cleaning wipes with and without washing liquids display other scratch resistances. Frequently data, such as pencil hardness or abrasive hardness, are used as a measure of the scratch resistance to be expected. Lubricants can improve or impair the scratch resistance of polymers. In the case of transparent materials, precisely the lubricants which improve the scratch resistance cause unattractive opacity and prevent application. In sheets 100×80×2 mm made of transparent polyamides, such as for example Grilamid TR 60 (XE 3942), Versapol® (obtainable from Polichem, paraffin oil), Loxiol® G40 (obtainable from Cognis, isotridecylstearate), stearylstearate, Licomont® CAV 102 P (obtainable from Clariant, Ca salts of montanic acids), Laventin® LNB (obtainable from BASF, alkanol polyglycolether) and Acrawax® C (obtainable from IMS CX Company, N,N'-ethylene-bisstearamide), Licomont® ET 132 P (obtainable from Clariant, montanic acid ester), Licowax® E (obtainable from Clariant, montanic acid ester), Licowax® OP (obtainable from Clariant, partially saponified montanic acid ester) cause slight opacity (haze). After two hours exposure of these plates in a tumbler filled with PE granulate, the lubricants Loxiol, Ca stearate and Licomont CAV 102 P display the lowest increase in haze and the lowest loss of gloss. The lubricants in examples 2 to 11 were tumbled on the polymer granulate Grilamid TR 60 (XE 3942) and incorporated with a ZSK25 twin shaft extruder by WP. 100×80×2 mm sheets with a film sprue were produced on an Arburg machine. The results of the examples are compiled in Table 2.

TABLE 2

Results Tumbler Test

| | | Examples | | | | | |
|---|---|---|---|---|---|---|---|
| | | E2 XE 3942 | E3 XE 3942 | E4 XE 3942 | E5 XE 3942 | E6 XE 3942 | E7 XE 3942 |
| Grilamid TR XE 3942 Nat. | | 100 | 99 | 99 | 99 | 99 | 99 |
| VERSAPOL GP446 | | | 1 | | | | |
| Loxiol G40 | | | | 1 | | | |
| Loxiol G53 | | | | | 1 | | |
| Ca Stearate | | | | | | 1 | |
| Stearylstearate | | | | | | | 1 |
| Licomont CAV 102 P | | | | | | | |
| Licomont ET 132 P | | | | | | | |
| Licowax E | | | | | | | |
| Licowax OP | | | | | | | |
| Transparency | % original | 93.1 | 92.4 | 92.6 | 93 | 93.1 | 93.7 |
| Clarity | % original | 99.6 | 99.5 | 99.6 | 99.3 | 98.6 | 99.6 |
| YI original | original | 6.2 | 9.6 | 9.6 | 3.3 | 3.8 | 2.3 |
| Haze original | % original | 0.45 | 1.11 | 0.63 | 1.71 | 3.62 | 0.41 |
| Haze | % 2 h PE | 13.2 | 18.2 | 3.6 | 3.3 | 14.1 | 9.2 |

| | | Examples | | | |
|---|---|---|---|---|---|
| | | E8 XE 3942 | E9 XE 3942 | E10 XE 3942 | E11 XE 3942 |
| Grilamid TR XE 3942 Nat. | | 99 | 99 | 99 | 99 |
| VERSAPOL GP446 | | | | | |
| Loxiol G40 | | | | | |
| Loxiol G53 | | | | | |
| Ca stearate | | | | | |
| Stearylstearate | | | | | |
| Licomont CAV 102 P | | 1 | | | |
| Licomont ET 132 P | | | 1 | | |
| Licowax E | | | | 1 | |
| Licowax OP | | | | | 1 |
| Transparency | % original | 93.6 | 48.7 | 48.6 | 64.7 |
| Clarity | % original | 99.5 | 93.9 | 96 | 99.2 |
| YI original | original | 2.8 | 7.1 | 8.7 | 23.5 |
| Haze original | % original | 0.57 | 97.5 | 95.2 | 60.3 |
| Haze | % 2 h PE | 3.2 | 97.8 | 95.5 | 66.5 |

EXAMPLE 3

Comparison of the Added Lubricants

Additives are added in general in the form of master batches (MB) during shaping on the injection moulding machine. For this purpose, the production of MB with high levels, i.e. high additions of effective additives, is required in order that supplements of less than 5% MB to the polymer granulate provide the necessary quantity of additives. Frequently, the low-viscous additives cannot be distributed sufficiently or only poorly in the polymer melt.

The efficiency of the same quantities of additives, compounded or mixed in as MB, frequently deviate from each other, in particular in the case of lubricants which must develop their effectiveness mainly on the surface in contact with the machine parts.

Lubricants which migrate easily to the surface are usually very incompatible with the polymer melt and have a tendency towards phase separation which then causes haze (opacity) in the transparent moulded article.

The normal processes for the production of MBs as compounds which meter lubricants into the feed of the extruder, fail just like the processes which meter as a liquid into the melt and are defeated by the slight tendency of the polymer melt to absorb the lubricant.

Contrary to expectation, MBs with 10% proportion were able to be produced with the selected, effective lubricants. The lubricant is added for this purpose into the melt at a remove of a few extruder zones from the feed. As a result MB granulates (used in example 13-23) were able to be produced with excellent homogeneity, with an excellent section, cf. Table 3.

Ca stearate, Loxiol G40, stearylstearate and Licomont CAV 102 P in examples 17-21 display a very low haze in the moulded article in the original state, i.e. before the tumbler test. After the tumbler test, the Loxiol G40 (examples 18 and 19) displays significantly lower haze values and less loss of gloss than the remaining ones. The results can be reproduced readily (example 13/14, 18/19, 20/21).

Hence moulded articles were able to be significantly improved with respect to scratch resistance without negatively influencing the transparency.

TABLE 3

|  |  | \multicolumn{5}{c}{Examples} |  |  |  |
| --- | --- | --- | --- | --- | --- | --- |
|  |  | E12 | E13 | E14 | E16 | E17 |
| Scratch resistance Basic polymer | Product MB | TR60 XE 3942 | TR60 XE 3942 | TR60 XE 3942 | TR60 XE 3942 | TR60 XE 3942 |
| Additive MB VERSAPOL GP 446 | % by wt. | 0 | 10 10 | 10 10 | 10 10 | 10 |
| Loxiol G40 |  |  |  |  |  |  |
| Ca stearate |  |  | 3 | 3 |  | 10 |
| Stearylstearate |  |  |  |  |  |  |
| Licomont CAV 102 P |  |  |  |  |  |  |
| Transparency | % original | 93.3 | 92.5 | 90.1 | 91.4 |  |
| Clarity | % original | 99.6 | 99.6 | 99.6 | 99.6 |  |
| YI Original | % original | 6.2 |  | 10.1 | 8.9 |  |
| Haze original | % original | 0.45 | 5.4 | 8.6 | 4.9 | 0.8 |
| Haze | % 2 h PE | 13.2 |  | 8.4 | 22.7 |  |

|  |  | \multicolumn{6}{c}{Examples} |  |  |  |  |  |
| --- | --- | --- | --- | --- | --- | --- | --- |
|  |  | E18 | E19 | E20 | E21 | E22 | E23 |
| Scratch resistance Basic polymer | Product MB | TR60 XE 3942 | TR60 XE 3942 | TR60 XE 3942 | TR60 XE 3942 | TR60 XE 3942 | TR60 XE 3942 |
| Additive MB VERSAPOL GP 446 | % by wt. | 10 | 10 | 10 | 10 | 10 | 20 |
| Loxiol G40 |  | 10 | 10 |  |  |  |  |
| Ca stearate |  |  |  |  |  |  |  |
| Stearylstearate |  |  |  | 10 | 10 |  |  |
| Licomont CAV 102 P |  |  |  |  |  | 10 | 20 |
| Transparency | % original | 93.1 | 93.3 | 93.1 | 93.2 | 92.8 | 89.3 |
| Clarity | % original | 99.6 | 99.8 | 99.6 | 99.7 | 99.8 | 99.8 |
| YI Original | % original | 7 | 3.7 | 7 | 3.8 | 14.8 | 25 |
| Haze original | % original | 0.4 | 0.38 | 0.4 | 0.58 | 0.66 | 2.58 |
| Haze | % 2 h PE | 2.8 | 2.9 | 14 | 16.1 | 13.5 | 68 |

TABLE 4

|  |  | E24 | E25 | E26 | E27 | E28 |
| --- | --- | --- | --- | --- | --- | --- |
| Grilamid TR XE 3942 Nat. |  | 100 | 99.5 | 99.5 | 99.5 | 99.5 |
| VERSAPOL GP446 |  |  | 0.5 |  |  |  |
| Ca stearate (S) |  |  |  | 0.5 |  |  |
| Stearylstearate |  |  |  |  | 0.5 |  |
| Stearic acid |  |  |  |  |  | 0.5 |
| Laventin LNB |  |  |  |  |  |  |
| Licowax S |  |  |  |  |  |  |
| Acrawax C |  |  |  |  |  |  |
| Loxiol G40 |  |  |  |  |  |  |
| Haze BYK Gardner original | 2 mm % | 2.1 | 2.3 | 2.6 | 3.1 | 2.9 |
| Transparency | 2 mm % | 84.7 | 89.4 | 88.3 | 87.1 | 88.5 |
| Clarity | 2 mm % | 99.3 | 99.5 | 99.3 | 99.1 | 99.3 |
| Yellow Index ASTM D 1925 | 2 mm % | 21.6 | 17.3 | 16.1 | 17.6 | 16.5 |
| Haze 2 h Tumbler | 2 mm % | 14.8 | 10.1 | 5.9 | 5.8 | 21.9 |

|  |  | E29 | E30 | E31 | E32 |
| --- | --- | --- | --- | --- | --- |
| Grilamid TR XE 3942 Nat. |  | 99.5 | 99.5 | 99.5 | 99.5 |
| VERSAPOL GP446 |  |  |  |  |  |
| Ca stearate (S) |  |  |  |  |  |
| Stearylstearate |  |  |  |  |  |
| Stearic acid |  |  |  |  |  |
| Laventin LNB |  | 0.5 |  |  |  |
| Licowax S |  |  | 0.5 |  |  |
| Acrawax C |  |  |  | 0.5 |  |
| Loxiol G40 |  |  |  |  | 0.5 |
| Haze BYK Gardner original | 2 mm % | 2.5 | 3.5 | 1.8 | 1.1 |
| Transparency | 2 mm % | 89.4 | 86.9 | 89.8 | 90.9 |
| Clarity | 2 mm % | 99 | 98.8 | 99.3 | 99.4 |
| Yellow Index ASTM D 1925 | 2 mm % | 15.8 | 20.6 | 16.5 | 15 |
| Haze 2 h Tumbler | 2 mm % | 14.1 | 5.9 | 19.3 | 14.6 |

The measurement results listed in Table 4 show that the best haze values are produced after the tumbler test for Grilamid TR 60 with 0.5% by weight of Ca stearate, stearylstearate and Licowax which produce superior measurement results relative to the Versapol variant.

The haze values for Grilamid TR 60 with 1% by weight of lubricant in Table 2 show, before the tumbler test, advantages for Loxiol G40 and Licomont CAV 102P. The haze values after the tumbler test display, in contrast, advantages for Loxiol G40, stearylstearate and Licomont CAV 102P. Relative to the Licomont, Loxiol G40 displays the lower yellowness and hence represents the best solution for high quantities of additive.

Relative to moulded articles without a lubricant, a significant improvement in the scratch resistance is achieved after the tumbler test, characterised in that the haze is thereby less.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding DE application No. 10 2007 062 063.4, filed Dec. 21, 2007, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A molded article produced from a transparent polyamide molding compound, which article is highly transparent and scratch resistant without surface coating, wherein the transparent polyamide molding compound, containing at least one copolyamide and one lubricant, contains
(A1) 50 to 99.99 parts by weight of a copolyamide, constructed from:
   a) 35%-40% by mol bis-(4-amino-3-methyl-cyclohexyl)methane (MACM),
   b) 18%-22% by mol isophthalic acid (IPS), and 16%-20% by mol by terephthalic acid (TPS), and
   c) 22%-27% by mol laurinlactam (LC 12), and
(A2) 0 to 49.99 parts by weight of a transparent polyamide based on MACM and/or PACM and dicarboxylic acids with at least 9 C-atoms, and
(A3) 0 to 29.99 parts by weight of an aliphatic polyamide based on monomers selected from the group consisting of diamines with at least 8 C-atoms, dicarboxylic acids with at least 10-C atoms, lactams with at least 10 C-atoms and amino carboxylic acids with at least 10 C-atoms,
   the sum of (A2) and (A3) being at most 49.99 parts by weight, and
(B) 0.01 to 5 parts by weight of isotridecylstearate, and
(C) 0 to 3 parts by weight of further additives,
with the proviso that the sum of (A1) and (A2) and (A3) and (B) produces 100 parts by weight, and
wherein (B) has been added via a master batch.

2. A molded article according to claim 1, wherein isotridecylstearate (B) is contained in a portion of 0.1 to 3% by weight.

3. A molded article according to claim 1, wherein the further additives (C) are selected from the group of UV stabilizers, heat stabilizers, catalysts, transparent colourants, phototropic additives, antistatic agents, processing aids and laser marking additives.

4. A method article according to claim 1, wherein the relative viscosity (RV) of the polyamide molding compound, measured in 0.5% m-cresol solution, is >1.45.

5. A molded article according to claim 1, wherein the Tg value is >175° C.

6. A molded article according to claim 1, which, when tested in the form of a sheet with a thickness of 2 mm, it has an opacity (haze), measured according to the Byk Gardner test according to ASTM 1003, which is greater by at most 200% compared with a 2 mm thick sheet made of an otherwise identical polyamide molding compound, however without lubricant (B).

7. A molded article according to claim 1, which, when tested in the form of a sheet with a thickness of 2 mm, it has an opacity (haze), measured according to the Byk Gardner test according to ASTM 1003, after a treatment duration of 2 hours in the tumbler, which is less compared with a 2 mm thick plate made of an otherwise identical polyamide molding article, however without isotridecylstearate (B), which was subjected also to the same treatment in the tumbler.

8. A molded article produced from a transparent polyamide molding compound which article is highly transparent and scratch resistant without surface coating, which, when tested in the form of a sheet with a thickness of 2 mm, has a transmission >90%, wherein the transparent polyamide molding compound, containing at least one copolymide and one lubricant, contains
(A1) 50 to 99.99 parts by weight of a copolyamide, constructed from:
   a) 35%-40% by mol bis-(4-amino-3-methyl-cyclohexyl)methane (MACM),
   b) 18%-22% by mol isophthalic acid (IPS), and 16%-20% by mol by terephthalic acid (TPS), and
   c) 22%-27% by mol laurinlactam (LC 12), and
(A2) 0 to 49.99 parts by weight of a transparent polyamide based on MACM and/or PACM and dicarboxylic acids with at least 9 C-atoms, and
(A3) 0 to 29.99 parts by weight of an aliphatic polyamide based on monomers selected from the group consisting of diamines with at least 8 C-atoms, dicarboxylic acids with at least 10-C atoms, lactams with at least 10 C-atoms and amino carboxylic acids with at least 10 C-atoms, the sum of (A2) and (A3) being at most 49.99 parts by weight, and
(B) 0.01 to 5 parts by weight of isotridecylstearate, and
(C) 0 to 3 parts by weight of further additives,
with the proviso that the sum of (A1) and (A2) and (A3) and (B) produces 100 parts by weight, and
wherein (B) has been added via a master batch.

9. A molded article according to claim 1, which has a modulus of elasticity of at least 1800 MPa, measured on a test body produced therefrom.

10. A molded article according to claim 1, wherein isotridecylstearate (B) is contained in a proportion of 0.2 to 2% by weight.

11. A molded article according to claim 1, wherein isotridecylstearate (B) is contained in a proportion of 0.5 to 1.5% by weight.

12. A molded article according to claim 1, wherein isotridecylstearate (B) is contained in a proportion of 0.8 to 1.2% by weight.

13. A molded article according to claim 1, wherein the relative viscosity (RV) of the polyamide molding compound, measured in 0.5% m-cresol solution, is 1.53 to 1.56.

14. A molded article according to claim 1, which, when tested in the form of a sheet with a thickness of 2 mm, has a transmission >91%.

15. A molded article according to claim 8, wherein isotridecylstearate (B) is contained in a proportion of 0.2 to 2% by weight.

16. A molded article according to claim 8, wherein isotridecylstearate (B) is contained in a proportion of 0.5 to 1.5% by weight.

17. A molded article according to claim 8, wherein isotridecylstearate (B) is contained in a proportion of 0.8 to 1.2% by weight.

18. A molded article produced from a transparent polyamide molding compound, which article is highly transparent and scratch resistant without surface coating, wherein the transparent polyamide molding compound, containing at least one copolyamide and one lubricant, contains (A1) 50 to 99.99 parts by weight of a copolyamide, constructed from:

a) 35%-40% by mol bis-(4-amino-3-methyl-cyclohexy) methane (MACM),
b) 18%-22% by mol isophthalic acid (IPS), and 16%-20% by mol by terephthalic acid (TPS), and
c) 22% to 27% by mol laurinlactam (LC 12), and (A2) 0 to 49.99 parts by weight of a transparent polyamide based on MACM and/or PACM and dicarboxylic acids with at least 9 C-atoms, and (A3) 0 to 29.99 parts by weight of an aliphatic polyamide based on monomers selected from the group consisting of diamines with at least 8 C-atoms, dicarboxylic acids with at least 10-C atoms, lactams with at least 10 C-atoms and amino carboxylic acids with at least 10 C-atoms, the sum of (A2) and (A3) being at most 49.99 parts by weight, and (B) 0.01 to 5 parts by weight of isotridecylstearate, and
(C) 0 to 3 parts by weight of further additives,
with the provisos that the sum of (A1) and (A2) and (A3) and (B) produces 100 parts by weight, and that the transparent polyamide molding compound does not contain any further lubricants, and wherein (B) has been added via a master batch.

* * * * *

UNITED STATES PATENT AND TRADEMARK OFFICE
CERTIFICATE OF CORRECTION

| | | |
|---|---|---|
| PATENT NO. | : 8,507,598 B2 | Page 1 of 1 |
| APPLICATION NO. | : 12/339573 | |
| DATED | : August 13, 2013 | |
| INVENTOR(S) | : Buhler et al. | |

It is certified that error appears in the above-identified patent and that said Letters Patent is hereby corrected as shown below:

In the Claims

Column 12, line 6 reads "bilizers, heat stabilizers, catalysts, transparent colourants," should read -- bilizers, heat stabilizers, catalysts, transparent colorants, --

Column 12, line 15 reads "tested in the form of a sheet with a thickness of 2mm, it has" should read -- tested in the form of a sheet with a thickness of 2mm, has --

Column 12, line 19 reads "wise identical polyamide molding compound, however with-" should read -- wise identical polyamide molded article, however with- --

Column 12, line 20 reads "out lubricant (B)." should read -- out isotridecylstearate (B). --

Column 12, line 25 reads "hours in the tumbler, which is less compared with a 2 mm" should read -- hours in a tumbler, which is less compared with a 2 mm --

Column 12, line 30 reads "molding compound which article is highly transparent and" should read -- molding compound, which article is highly transparent and --

Signed and Sealed this
Fifth Day of November, 2013

Teresa Stanek Rea
*Deputy Director of the United States Patent and Trademark Office*